(12) United States Patent
Schwartz et al.

(10) Patent No.: US 6,228,259 B1
(45) Date of Patent: *May 8, 2001

(54) OXYGENATED WATER COOLER

(75) Inventors: Henry Schwartz, Kings Point; Dennis E. Crowley, Adams; Jason Ritton, Schenevus; George P. Mravlja, Jr., Worcester; R. Glenn Wright, East Aurora; Doug Mowers, Worcester, all of NY (US)

(73) Assignee: Oxygen8, Inc., Jamaica, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/251,608

(22) Filed: Feb. 17, 1999

Related U.S. Application Data

(60) Continuation of application No. 09/124,490, filed on Jul. 29, 1998, now Pat. No. 6,017,447, which is a division of application No. 08/878,609, filed on Jun. 19, 1997, now Pat. No. 5,868,944.

(51) Int. Cl.[7] .................................................... C02F 1/72
(52) U.S. Cl. .............................. 210/198.1; 222/146.6; 210/192
(58) Field of Search .......................... 210/192, 198.1; 222/146.6

(56) References Cited

U.S. PATENT DOCUMENTS

| | | |
|---|---|---|
| 4,219,424 | 8/1980 | Tamura et al. . |
| 4,765,807 | 8/1988 | Henriksen . |
| 5,006,352 | 4/1991 | Zoltai et al. . |
| 5,108,590 | 4/1992 | DiSanto . |
| 5,295,519 | 3/1994 | Baker et al. . |
| 5,366,619 | * 11/1994 | Matsui et al. ................... 210/192 |
| 5,531,908 | 7/1996 | Matsumoto et al. . |
| 5,540,355 | 7/1996 | Hancock et al. . |
| 5,647,416 | 7/1997 | Desrosiers et al. . |
| 5,699,669 | 12/1997 | Gebhard . |
| 5,824,243 | 10/1998 | Contreras . |

FOREIGN PATENT DOCUMENTS

WO 95/29130   11/1995   (WO) .

* cited by examiner

*Primary Examiner*—David A. Simmons
*Assistant Examiner*—Betsey Morrison Hoey
(74) *Attorney, Agent, or Firm*—Schmeiser, Olsen & Watts

(57) ABSTRACT

An oxygenated water cooler and method of operating the same for dispensing oxygen enriched water from a bottle installed on the cooler wherein an oxygen source integrated into the cooler delivers oxygen through the water to a headspace above the water in the bottle to maintain the dissolved oxygen content of water in the bottle at an elevated level during the entire time water is dispensed from the bottle by the cooler, the elevated dissolved oxygen level having been established previously during the water bottling process. The oxygen source preferably comprises an oxygen generator, and such generator preferably comprises pressure swing absorption oxygen generating apparatus.

26 Claims, 2 Drawing Sheets

OXYGENATED WATER COOLER

Figure 1:
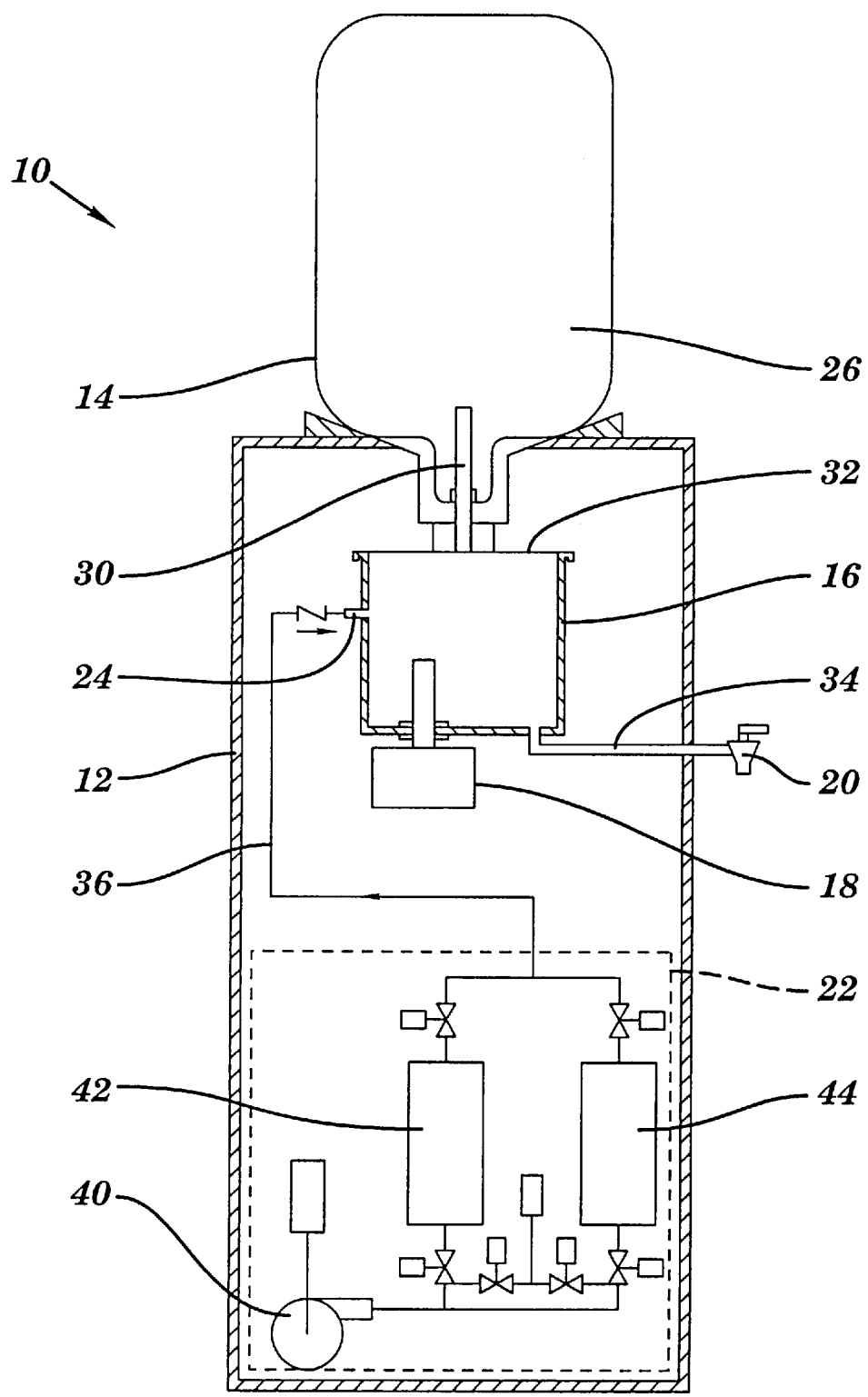

This application is a continuation of patent application Ser. No. 09/124,490, filed on Jul. 29, 1998, now U.S. Pat. No. 6,017,447, which is a divisional of Ser. No. 08/878,609 filed Jun. 19, 1997, now U.S. Pat. No. 5,868,944.

BACKGROUND OF THE INVENTION

This invention relates to the art of water coolers for dispensing drinking water, and more particularly to a new and improved water cooler for dispensing oxygen enriched water.

Oxygen enriched drinking water has an enhanced taste appeal. The term drinking water is intended to include, without limitation, spring water, filtered water or water treated by the reverse osmosis process. In addition, the enriched water offers the health and fitness conscious consumer an alternative and supplemental source of oxygen that is absorbed through the stomach. The dissolved oxygen content of natural pure water ranges from 5 mg/liter to 9 mg/liter depending on the source of the water and purification and processing techniques applied prior to bottling. The spring water can be supersaturated with oxygen by injecting molecular oxygen into a water pipeline controlled at a pressure of 40–90 PSIG. Using this technique the dissolved oxygen level of the water can be increased to 25–125 mg/liter. If bottled immediately in hermetically sealed bulk glass bottles, the water will maintain the elevated dissolved oxygen level indefinitely. Bulk glass bottles typically are in the 3–5 gallon range. However, upon opening the bottle and installing it on a standard water cooler the dissolved oxygen decreases to near the baseline level of 5–9 mg/liter within 3–5 days. Since the average time required to consume a 5 gallon water bottle typically is in the 10–14 day range, the rapid decrease in dissolved oxygen prevents the commercial marketing of oxygen enriched drinking water in 5 gallon bottles for use on standard water coolers.

It would, therefore, be highly desirable to provide a new and improved water cooler for dispensing oxygen enriched water wherein the dissolved oxygen content of water in the bottle installed on the cooler is maintained at the original supersaturated level during the entire time water is dispensed from the bottle by the cooler.

SUMMARY OF THE INVENTION

The present invention provides a new and improved water cooler and method of operating the same for dispensing oxygen enriched water from a bottle installed on the cooler, the water having a dissolved oxygen content at an elevated level previously established during bottling of the water, wherein an oxygen source integrated into the cooler delivers oxygen through the water to a headspace in the bottle above the water to maintain the dissolved oxygen content of water in the bottle substantially at the elevated level during the entire time water is dispensed from the bottle by the cooler. The oxygen source preferably comprises an oxygen generator, and such generator preferably comprises pressure swing adsorption oxygen generating apparatus. Alternatively, the oxygen source can be of various other forms including stored oxygen such as bottled oxygen.

The foregoing and additional advantages and characterizing features of the present invention will become clearly apparent upon a reading of the ensuing detailed description together with the included drawing wherein:

BRIEF DESCRIPTION OF THE DRAWING FIGURES

Figure 2:
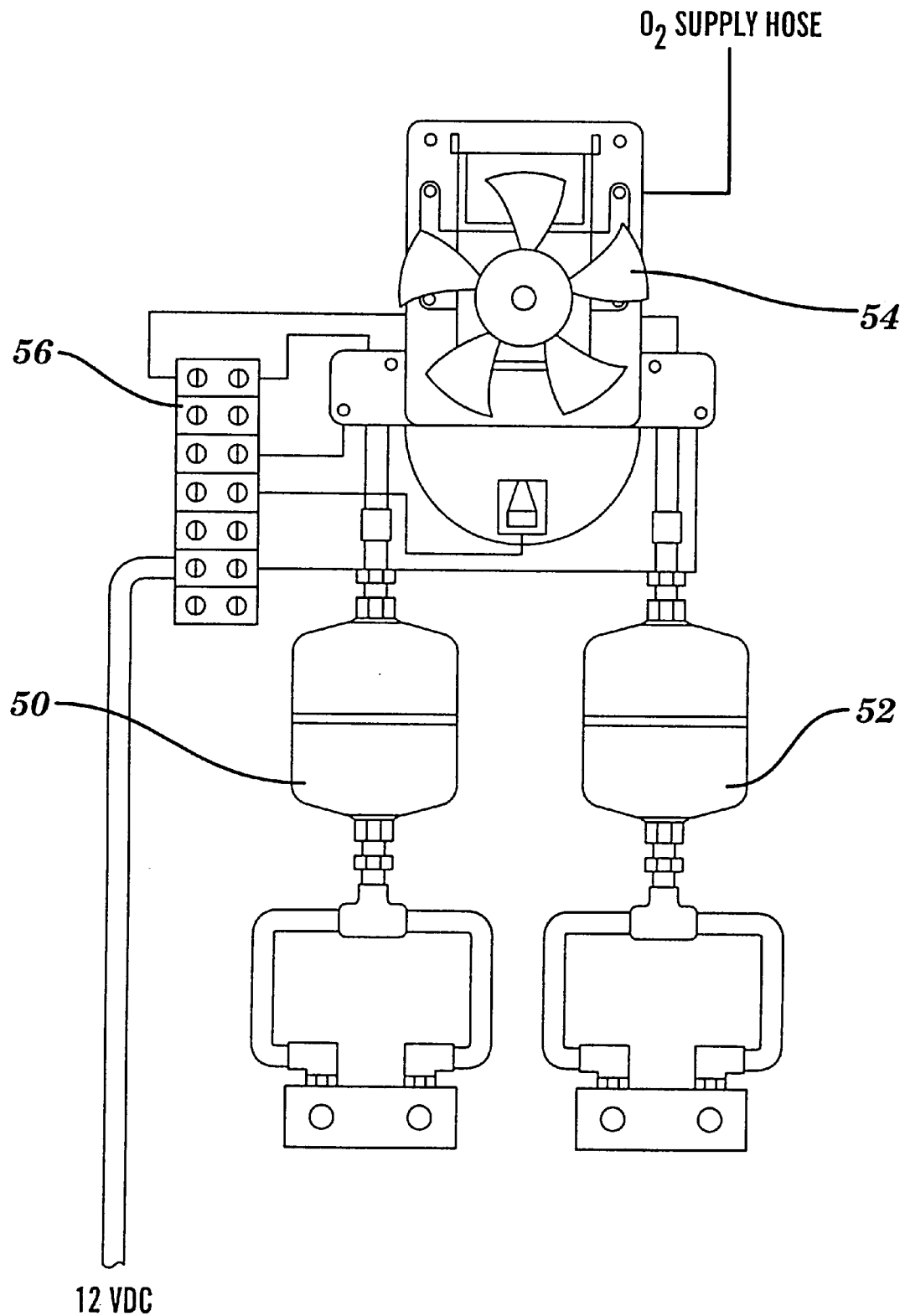

FIG. 1 is a diagrammatic view of the oxygenated water cooler according to the present invention; and FIG. 2 is an elevational view further illustrating the oxygen generator in the water cooler of FIG. 1.

DETAILED DESCRIPTION OF THE ILLUSTRATED EMBODIMENT

The oxygenated water cooler according to the present invention includes an apparatus which maintains the headspace in the inverted water bottle installed on the cooler at 80–95% pure oxygen. The bottle typically is a five gallon bottle, but three gallon or smaller size bottles can be employed. The purpose of the oxygen rich headspace is to maintain the dissolved oxygen concentration of the bottled water at 25–125 mg/liter. The water previously has been supersaturated with oxygen at the water purification and bottling plant immediately prior to filling into the bottles. Testing has proved that the dispensing of oxygen enriched water in standard water coolers results in rapid decline in the dissolved oxygen content of the water contained in the bottle. For example, within 3–5 days the dissolved oxygen levels dropped from 25–65 mg/liter to 10–13 mg/liter when 5 gallon bottles of oxygen enriched water were installed on a water cooler of standard, prior art design.

The oxygenated water cooler 10 according to the present invention is shown in FIG. 1 and includes, briefly, a housing or enclosure 12 for receiving a water bottle 14 which is inverted and installed on housing 12, a tank 16 within housing 12 for receiving water from bottle 14, a refrigeration source 18 for cooling water in tank 16, a spout 20 for dispensing water from tank 16, an oxygen source 22 preferably in the form of an on-board oxygen generator within housing 12 and means 24 for introducing oxygen from source 22 through the water to a void or headspace 26 within bottle 14 above the water therein.

Considering the apparatus of FIG. 1 in more detail, housing 12 preferably is of molded fiberglass construction but ultimately can be of other materials such as wood or metal. The water bottle 14 is installed in cooler 10 by being placed in an inverted position oil top of the cooler housing 12. The bottle cap (not shown) is pushed open and seals around a cylindrical transfer tube 30 which is attached to the top of the sealed water tank 16. The water tank 16 is constructed of stainless steel and is a cylindrical two piece design. The water tank lid 32 is removable to allow for cleaning. A food grade gasket (not shown) seals the lid to the top of the tank and the lid is held firmly fixed to the tank body with four locking clamps (not shown). The tank has a ⅛" tubing connection 24 in the sidewall for the supply of oxygen and one water outlet pipe connection 34 in the bottom. The outlet connection is piped directly to the dispensing nozzle valve 20. In this manner, the water bottle 14, transfer tube 30, and water tank 16 form a single vessel that is pressurized at 1–2 PSIG with 80–95% pure oxygen supplied to the side tubing connection via conduit 36 from source 22. As the water is drawn from the bottle 14 through the dispensing nozzle 20, make-up oxygen flows into the tank 16 and to headspace 26 from the oxygen source 22 and thus a positive pressure is maintained on the bottle 14. The water in tank 16 and bottle 14 thus serves as a conduit for transferring oxygen from source 22 to headspace 26.

Oxygen source 22 is in the form of a compact oxygen supply installed in the water cooler fiberglass enclosure 12. The supply 22 may be a small pressurized oxygen storage cylinder or an oxygen generation device which produces high purity oxygen from room air. In either case, the oxygen is delivered to the water tank 16 at a regulated pressure of 1–2 PSIG. The oxygen generator may be a single sieve bed pressure swing absorption (PSA) system with a capacity of 0.5–1.0 liters per minute. This method of oxygen generation is well established for large scale industrial applications. However, the small scale system required for this application is of special design to minimize space requirements, power consumption, and overall cost of the unit. The advantage of the oxygen generator over the storage tank approach is the elimination of the need for replacement of empty cylinders.

The water tank may be equipped with a refrigeration system 18 for maintaining the water dispensing temperature at or below 50 F. This device may consist of either a refrigerant compressor, condenser, and cooling coil or it may be a thermoelectric device. The water bottle 14 typically is 5 gallons in size and may be fabricated of either glass or Lexan (polycarbonate) plastic resin. In either case, the bottle dimensions are identical.

Thus, the present invention integrates an oxygen source into a water cooler to maintain previously oxygenated water in 5 gallon bottles in a supersaturated state. The supersaturated state is maintained by controlling the oxygen concentration in the bottle headspace at elevated levels throughout the usage cycle of the 5 gallon bottle.

The present invention is illustrated further by the following data. Table I includes test data that indicates the decay rate of oxygen saturation level in water bottles installed on watercoolers that are not provided with an oxygen source. Dissolved oxygen concentration was measured using an Orion Model 830 portable dissolved oxygen meter.

TABLE I

Rate of Dissolved Oxygen Concentration
Decline in Oxygenated Water
Standard Water Cooler With No Oxygen Source,
5 Gallon Glass Bottle

| Sample Date | Mg/Liter Dissolved Oxygen |
|---|---|
| 2-5-97 | 27.3 |
| 2-6-97 | 24.2 |
| 2-7-97 | 18.3 |
| 2-8-97 | 12.7 |
| 2-7-97 | 65.2 |
| 2-8-97 | 20.8 |
| 2-10-97 | 12.2 |
| 2-11-97 | 11.0 |
| 2-12-97 | 10.9 |

Table II includes data for water bottles installed on an oxygenated water cooler according to the present invention. The oxygen source used was bottled oxygen regulated to a pressure of 2 psig. Dissolved oxygen concentration was measured using an Orion Model 830 portable dissolved oxygen meter.

TABLE II

Rate of Dissolved Oxygen Concentration Decline
in Oxygenated Water

| Sample Date | Mg/liter Dissolved Oxygen |
|---|---|
| Oxygenated Water Cooler With Oxygen Source, 3 Gallon Plastic Bottle | |
| 1-31-97 AM | 46.5 |
| 1-31-97 PM | 43.7 |
| 2-1-97 | 42.6 |
| 2-3-97 | 50.0 |
| 2-4-97 | 45.2 |

TABLE II-continued

Rate of Dissolved Oxygen Concentration Decline
in Oxygenated Water

| Sample Date | Mg/liter Dissolved Oxygen |
|---|---|
| 2-5-97 | 40.8 |
| 2-6-97 | 38.9 |
| 2-7-97 | 38.8 |
| 2-8-97 | 40.2 |
| 2-10-97 | 41.3 |
| Oxygenated Water Cooler With Oxygen Source, 5 Gallon Glass Bottle | |
| 2-10-97 | 60.0 |
| 2-11-97 | 50.5 |
| 2-12-97 | 50.6 |
| 2-13-97 | 49.9 |
| 2-14-97 | 49.2 |
| 2-15-97 | 50.1 |
| 2-17-97 | 50.8 |
| 2-18-97 | 48.0 |
| 2-19-97 | 49.5 |
| 2-20-97 | 48.0 |

The foregoing data clearly shows that previously oxygenated water that is dispensed from a water cooler according to the present invention equipped with an oxygen source that maintains the bottle headspace at a minimum of 90% pure oxygen will maintain a supersaturated state (greater than 20 mg/liter dissolved oxygen) for the entire usage cycle (which is approximately ten days). Previously oxygenated water that is dispensed from a water cooler that is not equipped with an oxygen source to control headspace oxygen levels does not maintain the supersaturated state at the water cooler for more than 5 days. Therefore, standard, prior art water coolers without an oxygen source do not effectively deliver superoxygenated water at consistent dissolved oxygen levels throughout the 10–14 day usage cycle of a 5 gallon bottle. This data demonstrates the advantages and characterizing features of the present invention.

As previously mentioned, the preferred form of oxygen source 22 is an oxygen generator in the form of pressure swing adsorption apparatus. The pressure swing adsorption process is well known and, briefly, is a separation process used to extract oxygen from ambient or room air. The extraction is accomplished by injecting a stream of compressed air into a tank that is filled with a material called molecular sieve. This sieve is an inert ceramic material in bead form that is designed to adsorb nitrogen more quickly than oxygen. As pressure builds in the sieve tank nitrogen molecules attach themselves to the sieve while oxygen molecules pass through as the product gas. The product oxygen is then directed to a small storage tank where it is held until needed. The oxygen stored is available at pressures of up to 2 PSIG (pounds per square inch gage) and flow rates of 0.5 to 1.0 liters per minute.

Eventually, sieve in the first tank mentioned becomes saturated with nitrogen molecules and needs to be regenerated. This is done by venting the pressure in the sieve tank to the atmosphere. The nitrogen molecules previously attached to the sieve are released and within a few seconds the sieve bed is ready to begin accepting the feed air supply and producing oxygen again. The oxygen and air flows through the generator are controlled automatically by electrically operated solenoid valves. The valve cycle times are preset at electronic timers.

The oxygen generator system illustrated in FIG. 1 includes an air compressor 40, valves, timing circuits, tanks 42 and 44, pressure gauges, and all other required piping components to be considered a completely self contained oxygen generating system. FIG. 2 illustrates a miniaturized version having approximate dimensions of 14 inches in height, 6.5 inches in width and 8.0 inches in depth. The miniaturized version includes tanks 50 and 52, compressor 54 and control 56.

It is therefore apparent that the present invention accomplishes its intended objectives. While an embodiment of the present invention has been described in detail, that is for the purpose of illustration, not limitation.

What is claimed is:

1. An apparatus for dispensing drinking water comprising:
    a) a housing adapted to receive, on an upper end thereof, an inverted bottle containing drinking water;
    b) a tank within the housing, located below the upper end, to receive the drinking water flowing from the bottle by force of gravity;
    c) an outlet for dispensing the drinking water from the tank;
    d) an oxygen source within the housing; and
    e) a device for introducing oxygen from the oxygen source into the water.

2. The apparatus of claim 1, further comprising:
    a transfer tube attached to the top of the tank.

3. The apparatus of claim 2, wherein the water tank includes a lid and the transfer tube is attached to the lid.

4. The apparatus of claim 1, wherein the oxygen source is selected from the group consisting of a pressurized oxygen storage cylinder and an oxygen generation device.

5. The apparatus of claim 1, wherein the oxygen source is a single sieve bed pressure swing absorption system.

6. The apparatus of claim 5, wherein the single sieve bed pressure absorption system has a capacity of 0.5–1.0 liters per minute.

7. The apparatus of claim 1, wherein the oxygen source maintains the oxygen content within the drinking water in the bottle at a supersaturated state.

8. The apparatus of claim 1, wherein the housing contains a refrigeration source.

9. A water cooler comprising:
    a) a water tank for receiving oxygen from a bottle containing water;
    b) a system for dispensing the water from the water tank;
    c) a refrigeration source for cooling the water in the water tank;
    d) a compressed gas source; and
    e) a system for introducing compressed gas from the compressed gas source into the water.

10. A water cooler comprising:
    a) a housing adapted to receive a bottle containing water;
    b) a tank within the housing for receiving the water from the bottle; and
    c) an oxygen source coupled to the housing; and
    d) a system for introducing oxygen from the oxygen source into the water.

11. The apparatus of claim 10, further comprising:
    a transfer tube attached to the top of the tank.

12. The apparatus of claim 11, wherein the water tank includes a lid and the transfer tube is attached to the lid.

13. The apparatus of claim 10, wherein the oxygen source is selected from the group consisting of a pressurized oxygen storage cylinder and an oxygen generation device.

14. The apparatus of claim 10, wherein the oxygen source is a single sieve bed pressure swing absorption system.

15. The apparatus of claim 14, wherein the single sieve bed pressure absorption system has a capacity of 0.5–1.0 liters per minute.

16. The apparatus of claim 10, wherein the oxygen source maintains an oxygen content within the drinking water in the bottle at a supersaturated state.

17. The apparatus of claim 10, wherein the housing contains a refrigeration source.

18. A water cooler comprising:
    a) a housing adapted to receive a bottle containing water;
    b) a tank within the housing for receiving the water from the bottle;
    c) an outlet for dispensing the water from the tank;
    d) a transfer tube for joining the tank to the bottle; and
    e) an oxygen source coupled to the housing, wherein oxygen is transferred from the oxygen source into the water.

19. An apparatus for dispensing drinking water comprising:
    a) a housing adapted to receive, on an upper end thereof, an inverted bottle containing drinking water;
    b) a tank within the housing, located below the upper end, to receive the drinking water flowing from the bottle by force of gravity;
    c) an outlet for dispensing the drinking water from the tank;
    d) an oxygen source within the housing;
    e) a device for introducing oxygen from the oxygen source into the water; and
    f) a transfer tube attached to the top of the tank, wherein the oxygen source is operatively coupled for introduction of oxygen into the drinking water between the transfer tube and the outlet.

20. The apparatus of claim 19, wherein the oxygen source is operatively coupled to the tank.

21. An apparatus for dispensing drinking water comprising:
    a) a housing adapted to receive, on an upper end thereof, an inverted bottle containing drinking water;
    b) a tank within the housing, located below the upper end, to receive the drinking water flowing from the bottle by force of gravity;
    c) an outlet for dispensing the drinking water from the tank;
    d) an oxygen source within the housing; and
    e) a device for introducing oxygen from the oxygen source into the water and wherein the bottle a transfer tube and the water tank are pressurized with 80–95% pure oxygen.

22. An apparatus for dispensing drinking water comprising:
    a) a housing adapted to receive, on an upper end thereof, an inverted bottle containing drinking water;
    b) a tank within the housing, located below the upper end, to receive the drinking water flowing from the bottle by force of gravity;
    c) an outlet for dispensing the drinking water from the tank;
    d) an oxygen source within the housing; and
    e) a device for introducing oxygen from the oxygen source into the water and wherein the oxygen source further includes a molecular sieve having a material which absorbs nitrogen more quickly than oxygen.

23. A water cooler comprising:
   a) a housing adapted to receive a bottle containing drinking water;
   b) a tank within the housing for receiving the drinking water from the bottle;
   c) an oxygen source coupled to the housing; and
   d) a system for introducing oxygen from the oxygen source into the drinking water wherein the oxygen source is operatively coupled for introduction of oxygen into the drinking water between a transfer tube and an outlet.

24. The apparatus of claim 23, wherein the oxygen source is operatively coupled to the tank.

25. A water cooler comprising:
   a) a housing adapted to receive a bottle containing water;
   b) a tank within the housing for receiving water from the bottle;
   c) an oxygen source coupled to the housing; and
   d) a system for introducing oxygen from the oxygen source into the water, wherein the water is pressurized with at least 80% pure oxygen.

26. A water cooler comprising:
   a) a housing adapted to receive a bottle containing water;
   b) a tank within the housing for receiving the water from the bottle; and
   c) an oxygen source coupled to the housing; and
   d) a system for introducing oxygen from the oxygen source into the water, wherein the oxygen source further includes a molecular sieve having a material which absorbs nitrogen more quickly than oxygen.

* * * * *